(12) United States Patent
Yoshida et al.

(10) Patent No.: US 9,875,822 B2
(45) Date of Patent: Jan. 23, 2018

(54) ALUMINUM ALLOY CONDUCTOR WIRE, ALUMINUM ALLOY STRANDED WIRE, COATED WIRE, WIRE HARNESS AND METHOD OF MANUFACTURING ALUMINUM ALLOY CONDUCTOR WIRE

(71) Applicants: FURUKAWA ELECTRIC CO., LTD., Tokyo (JP); FURUKAWA AUTOMOTIVE SYSTEMS INC., Shiga (JP)

(72) Inventors: Sho Yoshida, Tokyo (JP); Ryosuke Matsuo, Tokyo (JP); Shigeki Sekiya, Tokyo (JP); Kengo Mitose, Tokyo (JP)

(73) Assignees: FURUKAWA ELECTRIC CO., LTD., Tokyo (JP); FURUKAWA AUTOMOTIVE SYSTEMS INC., Inukami-gun, Shiga (JP)

( * ) Notice: Subject to any disclaimer, the term of this patent is extended or adjusted under 35 U.S.C. 154(b) by 0 days.

(21) Appl. No.: 15/353,375

(22) Filed: Nov. 16, 2016

(65) Prior Publication Data
US 2017/0069403 A1    Mar. 9, 2017

Related U.S. Application Data

(63) Continuation of application No. PCT/JP2015/065147, filed on May 26, 2015.

(30) Foreign Application Priority Data

May 26, 2014   (JP) ................. 2014-107698

(51) Int. Cl.
| | |
|---|---|
| H01B 7/00 | (2006.01) |
| H01B 5/08 | (2006.01) |
| C22C 21/04 | (2006.01) |
| C22C 21/06 | (2006.01) |
| C22C 21/08 | (2006.01) |
| H01B 1/02 | (2006.01) |
| C22F 1/05 | (2006.01) |
| H01B 5/02 | (2006.01) |
| H01B 13/00 | (2006.01) |
| B21C 1/00 | (2006.01) |
| B21C 1/02 | (2006.01) |
| B22D 21/00 | (2006.01) |
| B60R 16/02 | (2006.01) |
| C22C 21/02 | (2006.01) |
| C22F 1/043 | (2006.01) |
| C22F 1/047 | (2006.01) |

(52) U.S. Cl.
CPC ............ *H01B 1/023* (2013.01); *B21C 1/003* (2013.01); *B21C 1/02* (2013.01); *B22D 21/007* (2013.01); *B60R 16/0207* (2013.01); *C22C 21/02* (2013.01); *C22C 21/08* (2013.01); *C22F 1/043* (2013.01); *C22F 1/047* (2013.01); *C22F 1/05* (2013.01); *H01B 1/02* (2013.01); *H01B 5/02* (2013.01); *H01B 5/08* (2013.01); *H01B 7/00* (2013.01); *H01B 7/0045* (2013.01); *H01B 13/00* (2013.01); *H01B 13/0016* (2013.01)

(58) Field of Classification Search
CPC .. H01B 1/02; H01B 1/023; H01B 5/02; C22C 21/00; C22C 21/02; C22C 21/08; C22C 21/14
USPC ........ 174/72 A, 110 R, 128.1; 420/544, 546, 420/535; 428/544
See application file for complete search history.

(56) References Cited

U.S. PATENT DOCUMENTS

| | | | | |
|---|---|---|---|---|
| 3,843,418 A | * | 10/1974 | Oida et al. | C22C 21/08 148/415 |
| 4,042,424 A | * | 8/1977 | Nicoud | C22C 21/08 148/417 |
| 2003/0143102 A1 | * | 7/2003 | Matsuoka | C22C 21/04 420/546 |
| 2006/0013719 A1 | * | 1/2006 | Ichikawa | C22C 21/10 419/29 |
| 2007/0221396 A1 | * | 9/2007 | Izumida | C21D 8/06 174/128.1 |

(Continued)

FOREIGN PATENT DOCUMENTS

| | | |
|---|---|---|
| JP | 60-125356 A | 7/1985 |
| JP | 2004-134212 A | 4/2004 |

(Continued)

OTHER PUBLICATIONS

International Search Report for PCT/JP2015/065147 (PCT/ISA/210) dated Aug. 25, 2015.

(Continued)

*Primary Examiner* — Timothy Thompson
*Assistant Examiner* — Rhadames J Alonzo Miller
(74) *Attorney, Agent, or Firm* — Birch, Stewart, Kolasch & Birch, LLP

(57) ABSTRACT

An aluminum alloy conductor wire has a composition comprising Mg: 0.1-1.0 mass %, Si: 0.1-1.20 mass %, Fe: 0.01-1.40 mass %, Ti: 0-0.100 mass %, B: 0-0.030 mass %, Cu: 0-1.00 mass %, Ag: 0-0.50 mass %, Au: 0-0.50 mass %, Mn: 0-1.00 mass %, Cr: 0-1.00 mass %, Zr: 0-0.50 mass %, Hf: 0-0.50 mass %, V: 0-0.50 mass %, Sc: 0-0.50 mass %, Co: 0-0.50 mass %, Ni: 0-0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained. A density of a compound having a particle size of 0.5-5.0 μm and containing Fe is 1 to 300 particles/10000 μm².

11 Claims, No Drawings

(56) References Cited

U.S. PATENT DOCUMENTS

| | | | | |
|---|---|---|---|---|
| 2008/0196923 | A1* | 8/2008 | Susai | C22C 21/00 174/110 R |
| 2010/0059151 | A1* | 3/2010 | Iwamura | C22C 21/12 148/690 |
| 2010/0071933 | A1* | 3/2010 | Otsuka | C21D 9/60 174/128.1 |
| 2011/0132659 | A1* | 6/2011 | Kusakari | B21C 1/00 174/72 A |
| 2011/0140517 | A1 | 6/2011 | Kusakari et al. | |
| 2012/0118607 | A1* | 5/2012 | Ishibashi | C22C 21/00 174/126.1 |
| 2012/0217060 | A1 | 8/2012 | Kusakari et al. | |
| 2012/0321889 | A1 | 12/2012 | Sekiya et al. | |
| 2012/0328471 | A1 | 12/2012 | Sekiya et al. | |
| 2013/0126231 | A1 | 5/2013 | Kusakari et al. | |
| 2013/0264115 | A1* | 10/2013 | Kobayashi | H01B 1/023 174/72 A |
| 2015/0007910 | A1 | 1/2015 | Sekiya et al. | |
| 2015/0235729 | A1 | 8/2015 | Yoshida et al. | |

FOREIGN PATENT DOCUMENTS

| | | |
|---|---|---|
| JP | 2010-163676 A | 7/2010 |
| JP | 2010-163677 A | 7/2010 |
| JP | 4986251 B2 | 7/2012 |
| JP | 4986252 B2 | 7/2012 |
| JP | 2013-44038 A | 3/2013 |
| WO | WO 2010/018646 A1 | 2/2010 |
| WO | WO 2011/052644 A1 | 5/2011 |
| WO | WO 2012/141041 A1 | 10/2012 |
| WO | WO 2013/147270 A1 | 10/2013 |
| WO | WO 2014/155820 A1 | 10/2014 |

OTHER PUBLICATIONS

Written Opinion of the International Searching Authority for PCT/JP2015/065147 (PCT/ISA/237) dated Aug. 25, 2015.

* cited by examiner

ALUMINUM ALLOY CONDUCTOR WIRE, ALUMINUM ALLOY STRANDED WIRE, COATED WIRE, WIRE HARNESS AND METHOD OF MANUFACTURING ALUMINUM ALLOY CONDUCTOR WIRE

CROSS REFERENCE TO RELATED APPLICATIONS

This is a continuation application of International Patent Application No. PCT/JP2015/065147 filed May 26, 2015, which claims the benefit of Japanese Patent Application No. 2014-107698, filed May 26, 2014, the full contents of all of which are hereby incorporated by reference in their entirety.

BACKGROUND

Technical Field

The present disclosure relates to an aluminum alloy conductor wire used as a conductor of an electric wiring structure, an aluminum alloy stranded wire, a coated wire, a wire harness, and a method of manufacturing an aluminum alloy conductor wire.

Background

In the related art, a so-called wire harness are being used as an electric wiring structure for transportation vehicles such as automobiles, trains, and aircrafts, or an electric wiring structure for industrial robots. The wire harness is a member including electric wires each having a conductor made of copper or copper alloy and fitted with terminals (connectors) made of copper or copper alloy (e.g., brass). With recent rapid advancements in performances and functions of automobiles, various electrical devices and control devices installed in vehicles tend to increase in number and electric wiring structures used for devices also tends to increase in number. On the other hand, for environmental friendliness, lightweighting of transportation vehicles is strongly desired for improving fuel efficiency of transportation vehicles such as automobiles.

As one of the measures for achieving lightweighting of transportation vehicles, there have been, for example, continuous efforts in the studies of using aluminum or aluminum alloys as a conductor of an electric wiring structure, which is more lightweight, instead of conventionally used copper or copper alloys. Aluminum has a specific gravity of about one-third of a specific gravity of copper and has a conductivity of about two-thirds of a conductivity of copper (in a case where pure copper is a standard for 100% IACS, pure aluminum has approximately 66% IACS). An aluminum conductor wire rod needs to have a cross sectional area of approximately 1.5 times greater than that of a copper conductor wire rod to allow the same electric current as the electric current flowing through the copper conductor wire rod to flow through the pure aluminum conductor wire rod. Even if an aluminum conductor wire rod having an increased cross section as described above is used, an aluminum conductor wire rod has a mass of about half the mass of a pure copper conductor wire rod. Therefore, it is advantageous to use an aluminum conductor wire rod considering lightweighting. Note that, "% IACS" represents a conductivity when a resistivity $1.7241 \times 10^{-8}$ $\Omega$m of International Annealed Copper Standard is taken as 100% IACS.

However, it is known that pure aluminum wire rods, typically an aluminum alloy wire rod for transmission lines (JIS (Japanese Industrial Standard) A1060 and A1070), is generally poor in its durability to tension, shock resistance, and bending characteristics. Therefore, for example, it cannot withstand a load abruptly applied by an operator or an industrial device while being installed to a car body, a tension at a crimp portion of a connecting portion between an electric wire and a terminal, and a cyclic stress loaded at a bending portion such as a door portion. On the other hand, an alloyed material containing various additive elements added thereto is capable of achieving an increased tensile strength, but conductivity may decrease due to a solution phenomenon of the additive elements into aluminum, and because of excessive intermetallic compounds formed in aluminum, a wire break due to the intermetallic compounds may occur during wire drawing. Therefore, it is essential to limit or select additive elements to provide sufficient elongation characteristics to prevent a wire break, and it is further necessary to ensure a conductivity and a tensile strength equivalent to those in the related art.

For example, aluminum alloy wire rods containing Mg and Si are known as high strength aluminum alloy wire rods. A typical example of this aluminum alloy wire rod is a 6xxx series aluminum alloy (Al—Mg—Si based alloy) wire rod. Generally, the strength of the 6xxx series aluminum alloy wire rod can be increased by applying a solution treatment and an aging treatment, and thus, when manufacturing a fine wire such as a wire having a wire size of less than or equal to 1.5 mm using a 6xxx series aluminum alloy wire rod, the strength can be increased by applying a solution heat treatment and an ageing treatment.

For example, Japanese Patent No. 4986252, Japanese Patent No. 4986251, Japanese Laid-Open Patent Publication No. 2010-163677 and Japanese Laid-Open Patent Publication No. 2010-163676 disclose a conventional 6xxx series aluminum alloy wire used for an electric wiring structure of the transportation vehicle and a manufacturing method thereof. Japanese Patent No. 4986252 discloses a method of manufacturing a 6xxx series aluminum alloy wire in which steps of casting and rolling, wire drawing, intermediate heat treatment, wire drawing and solution (recrystallization) heat treatment are performed in this order, wherein a rod of 10 mmφ is manufactured at a cooling rate of 1° C./s to 20° C./s during casting and rolling, intermediate annealing is performed at 300 to 450° C. for 0.5 to 4 hours during an intermediate heat treatment, and thereafter final annealing is performed at 437° C. to 641° C. for 0.03 to 0.54 hours during a subsequent solution heat treatment. Japanese Patent No. 4986251 discloses a method of manufacturing a 6xxx series aluminum alloy wire in which steps similar to those described above are performed, wherein a rod of 10 mmφ is manufactured at a cooling rate of 1° C./s to 20° C./s during casting and rolling, intermediate annealing is performed at 300 to 450° C. for 0.17 to 4 hours during an intermediate heat treatment, and thereafter final annealing is performed at 415° C. to 633° C. for 0.03 to 0.54 hours during a subsequent solution heat treatment.

Japanese Laid-Open Patent Publication No. 2010-163677 discloses a method of manufacturing a 6xxx series aluminum alloy wire in which steps of casting, wire drawing, intermediate heat treatment, wire drawing and solution (recrystallization) heat treatment are performed in this order, wherein an ingot is manufactured at a cooling rate of 10° C./s to 300° C./s during casting, a heat treatment is performed at 300 to 450° C. for 1 to 4 hours during an intermediate heat treatment, and thereafter a heat treatment is performed at 300° C. to 450° C. for 1 to 4 hours during solution heat treatment. Further, Japanese Laid-Open Patent Publication No. 2010-163676 discloses a method of manufacturing a 6xxx series aluminum alloy wire in which steps of casting, wire drawing, intermediate heat treatment and wire drawing are performed in this order, wherein an ingot is manufactured at a cooling rate of 10° C./s to 300° C./s during casting.

However, with the aluminum alloy wires of Japanese Patent No. 4986252, Japanese Patent No. 4986251, Japanese Laid-Open Patent Publication No. 2010-163677 and Japanese Laid-Open Patent Publication No. 2010-163676, abnormal growth of crystal grains may occur locally during heat treatment in a manufacturing process, and, as a result, there is a drawback that an amount of plastic deformation of an electric wire upon crimping may vary and crimp reliability upon crimping to an object such as a terminal is insufficient.

It is an object of the present disclosure to provide an aluminum alloy conductor wire that has improved crimp reliability while ensuring excellent strength even configured as a fine wire having a wire diameter of less than or equal to 1.5 mm and used as a conductor of an electric wiring structure, as well as an aluminum alloy stranded wire, a coated wire, and a wire harness, and to provide a method of manufacturing an aluminum alloy conductor wire.

The present disclosure is related to providing a manufacturing method and a structure in which, based on a prerequisite that an aluminum alloy containing Mg, Si and Fe is used, controlling a component composition and a manufacturing process, abnormal growth of crystal grains upon recrystallization is uniformly suppressed using a particle pinning effect, and crimp reliability is improved while ensuring excellent strength.

SUMMARY

According to a first aspect of the present disclosure, an aluminum alloy conductor wire having a composition comprising or consisting of Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, a density of a compound having a particle size of 0.5 to 5.0 µm and containing Fe being 1 to 300 particles/10000 µm².

According to a second aspect of the present disclosure, a wire harness comprises a coated wire including a coating layer at an outer periphery of one of an aluminum alloy conductor wire and an aluminum alloy stranded wire, the aluminum alloy stranded wire comprising a plurality of the aluminum alloy conductor wires which are stranded together, and a terminal fitted at an end portion of the coated wire, the coating layer being removed from the end portion, wherein an aluminum alloy conductor wire has a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, and a density of a compound having a particle size of 0.5 to 5.0 µm and containing Fe is 1 to 300 particles/10000 µm².

According to a third aspect of the present disclosure, a method of manufacturing an aluminum alloy conductor wire has a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, a density of a compound having a particle size of 0.5 to 5.0 µm and containing Fe being 1 to 300 particles/10000 µm², the method comprising: forming a rough drawing wire through hot working subsequent to melting and casting, and thereafter carrying out processes including at least a wire drawing process, a solution heat treatment process and an aging heat treatment process, wherein a cooling rate during the casting is 0.1° C./s to 5° C./s.

According to a fourth aspect of the present disclosure, a method of manufacturing an aluminum alloy conductor wire has a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, a density of a compound having a particle size of 0.5 to 5.0 µm and containing Fe being 1 to 300 particles/10000 µm², the method comprising: forming a rough drawing wire through hot working subsequent to melting and casting, and thereafter carrying out processes including at least a wire drawing process, a solution heat treatment process and an aging heat treatment process, wherein a cooling rate during the casting has a value greater than 5° C./s, and a temperature increasing rate during the solution heat treatment is less than or equal to 20° C./s between room temperature and 550° C.

According to an aluminum alloy conductor wire of the present disclosure, provided that an aluminum alloy containing Mg, Si and Fe is used, by controlling at least a cooling rate or a temperature increasing rate during solution heat treatment so that Fe-based compound having a particle size within a predetermined range is uniformly dispersed in a crystalline structure, an occurrence of abnormal grain growth during recrystallization can be suppressed uniformly, and thus the strength of a matrix can be improved and a crystal grain size can be homogenized. Accordingly, even when used as a fine wire such as a wire having a wire size of less than or equal to 1.5 mmφ, an amount of plastic deformation of an aluminum electric wire conductor upon crimping can be stabilized, and reliability upon crimping with an object such as a terminal can be improved while ensuring an excellent strength. Therefore, an aluminum alloy conductor wire, an aluminum alloy stranded wire, a coated wire and a wire harness according to the present disclosure is useful as a battery cable, a harness, or a conductor for motor installed in transportation vehicles, and a wiring structure of an industrial robot.

DETAILED DESCRIPTION

An aluminum alloy conductor wire of the present disclosure is an aluminum alloy conductor wire comprising or consisting of Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, a density of a compound having a particle size of 0.5 to 5.0 μm and containing Fe is 1 to 300 particles/10000 μm$^2$.

The aluminum alloy conductor wire of the present disclosure can be used as an aluminum alloy wire, or as an aluminum alloy stranded wire obtained by stranding a plurality of aluminum alloy wires, and may also be used as a coated wire having a coating layer at an outer periphery of the aluminum alloy wire or the aluminum alloy stranded wire, and, in addition, it can also be used as a wire harness having a coated wire and a terminal fitted at an end portion of the coated wire, the coating layer being removed from the end portion.

Hereinafter, reasons for limiting chemical compositions or the like of the aluminum alloy conductor wire of the present disclosure will be described.
(1) Chemical Composition
<Mg: 0.10 Mass % to 1.00 Mass %>

Mg (magnesium) is an element having a strengthening effect by forming a solid solution with an aluminum matrix, and a part thereof has an effect of improving a tensile strength, a bending fatigue resistance and a heat resistance by forming precipitates or Mg—Si clusters together with Si. However, in a case where Mg content is less than 0.10 mass %, the above effects are insufficient. In a case where Mg content exceeds 1.00 mass %, there is an increased possibility that a Mg-concentration part will be formed on a grain boundary, thus resulting in decreased tensile strength, elongation, and bending fatigue resistance, as well as a reduced conductivity due to an increased amount of Mg element forming the solid solution. Accordingly, the Mg content is 0.10 mass % to 1.00 mass %. The Mg content is, when a high strength is of importance, preferably 0.50 mass % to 1.00 mass %, and in case where a conductivity is of importance, preferably 0.10 mass % to 0.50 mass %. Based on the points described above, 0.30 mass % to 0.70 mass % is generally preferable.

<Si: 0.10 Mass % to 1.20 Mass %>

Si (silicon) is an element that has an effect of improving a tensile strength, a bending fatigue resistance and a heat resistance by form precipitates or Mg—Si clusters together with Mg. However, in a case where Si content is less than 0.10 mass %, the above effects are insufficient. In a case where Si content exceeds 1.20 mass %, there is an increased possibility that an Si-concentration part will be formed on a grain boundary, thus resulting in decreased tensile strength, elongation, and fatigue resistance, as well as a reduced conductivity due to an increased amount of Si element forming the solid solution. Accordingly, the Si content is 0.10 mass % to 1.20 mass %. The Si content is, when a high strength is of importance, preferably 0.50 mass % to 1.00 mass %, and in case where a conductivity is of importance, preferably 0.10 mass % to 0.50 mass %. Based on the points described above, 0.30 mass % to 0.70 mass % is generally preferable.
<Fe: 0.01 Mass % to 1.40 Mass %>

Fe (iron) is an element that contributes to refinement of crystal grains mainly by forming an Al—Fe based intermetallic compound and provides improved tensile strength and bending fatigue resistance. Fe dissolves in Al only by 0.05 mass % at 655° C. and even less at room temperature. Accordingly, the remaining Fe that could not dissolve in Al will be crystallized or precipitated as an intermetallic compound such as Al—Fe, Al—Fe—Si, and Al—Fe—Si—Mg. This intermetallic compound contributes to refinement of crystal grains and provides improved tensile strength and bending fatigue resistance. Further, Fe has, also by Fe that has dissolved in Al, an effect of providing an improved tensile strength. In a case where Fe content is less than 0.01 mass %, those effects are insufficient. In a case where Fe content exceeds 1.40 mass %, an amount of plastic deformation upon crimping does not take a value within a predetermined range, and a conductor crimping property upon crimping decreases. Therefore, Fe content is 0.01 mass % to 1.40 mass %, and preferably 0.15 mass % to 0.90 mass %, and more preferably 0.15 mass % to 0.45 mass %.

The aluminum alloy conductor wire of the present disclosure includes Mg, Si and Fe as essential components, and may further contain at least one selected from a group comprising or consisting of Ti and B, and/or at least one selected from a group comprising or consisting of Cu, Ag, Au, Mn, Cr, Zr, Hf, V, Sc, Co and Ni, as necessary.
<Ti: 0.001 Mass % to 0.100 Mass %>

Ti is an element having an effect of refining the structure of an ingot during dissolution casting. In a case where an ingot has a coarse structure, the ingot may crack during casting or a wire break may occur during a wire rod processing step, which is industrially undesirable. In a case where Ti content is less than 0.001 mass %, the aforementioned effect cannot be achieved sufficiently, and in a case where Ti content exceeds 0.100 mass %, the conductivity tends to decrease. Accordingly, the Ti content is 0.001 mass % to 0.100 mass %, preferably 0.005 mass % to 0.050 mass %, and more preferably 0.005 mass % to 0.030 mass %.
<B: 0.001 Mass % to 0.030 Mass %>

Similarly to Ti, B is an element having an effect of refining the structure of an ingot during dissolution casting. In a case where an ingot has a coarse structure, the ingot may crack during casting or a wire break is likely to occur during a wire rod processing step, which is industrially undesirable. In a case where B content is less than 0.001 mass %, the aforementioned effect cannot be achieved sufficiently, and in a case where B content exceeds 0.030 mass %, the conductivity tends to decrease. Accordingly, the B content is 0.001 mass % to 0.030 mass %, preferably 0.001 mass % to 0.020 mass %, and more preferably 0.001 mass % to 0.010 mass %.

To contain at least one of <Cu: 0.01 mass % to 1.00 mass %>, <Ag: 0.01 mass % to 0.50 mass %>, <Au: 0.01 mass % to 0.50 mass %>, <Mn: 0.01 mass % to 1.00 mass %>, <Cr: 0.01 mass % to 1.00 mass %>, and <Zr: 0.01 mass % to 0.50 mass %>, <Hf: 0.01 mass % to 0.50 mass %>, <V: 0.01 mass % to 0.50 mass %>, <Sc: 0.01 mass % to 0.50 mass %>, <Co: 0.01 mass % to 0.50 mass %>, and <Ni: 0.01 mass % to 0.50 mass %>.

Each of Cu, Ag, Au, Mn, Cr, Zr, Hf, V, Sc, Co and Ni is an element having an effect of refining crystal grains and suppressing production of abnormally and coarsely grown grain, and Cu, Ag and Au are elements further having an effect of increasing a grain boundary strength by being precipitated at a grain boundary. In a case where at least one of the elements described above is contained by 0.01 mass % or more, the aforementioned effects can be achieved and a tensile strength, an elongation, and a bending fatigue resistance can be further improved. On the other hand, in a case where any one of Cu, Ag, Au, Mn, Cr, Zr, Hf, V, Sc, Co and Ni has a content exceeding the upper limit thereof mentioned above, a wire break is likely to occur since a compound containing the said elements coarsens and deteriorates wire drawing workability, and also a conductivity tends to decrease. Therefore, ranges of contents of Cu, Ag, Au, Mn, Cr, Zr, Hf, V, Sc, Co and Ni are the ranges described above, respectively. Among elements in this group, it is particularly preferable to contain Ni. When Ni is contained, an effect of refining crystal grains and an effect of suppressing production of abnormally and coarsely grown grain becomes significant, and tensile strength and elongation increase. Further, suppression of lowering of conductivity and wire break during an elongation process can be facilitated. Since this effect becomes significant, a content of Ni is further preferably, 0.05 mass % to 0.3 mass %.

The more the contents of Fe, Ti, B, Cu, Ag, Au, Mn, Cr, Zr, Hf, V, Sc, Co and Ni, the lower the conductivity tends to be and the more the wire drawing workability tends to deteriorate. Therefore, it is preferable that a sum of the contents of the elements is less than or equal to 2.00 mass %. With the aluminum alloy conductor wire of the present disclosure, since Fe is an essential element, the sum of contents of Fe, Ti, B, Cu, Ag, Au, Mn, Cr, Zr, Hf, V, Sc, Co and Ni is 0.01 mass % to 2.00 mass %. It is further preferable that the sum of contents of these elements is 0.10 mass % to 2.00 mass %. In a case where the above elements are added alone, the compound containing the element tends to coarsen more as the content increases. Since this may degrade wire drawing workability and a wire break is likely to occur, ranges of content of the respective elements are as specified above.

In order to improve the tensile strength, the elongation, and the proof stress value while maintaining a high conductivity, the sum of contents of Fe, Ti, B, Cu, Ag, Au, Mn, Cr, Zr, Hf, V, Sc, Co and Ni is particularly preferably 0.01 mass % to 0.80 mass %, and further preferably 0.05 mass % to 0.60 mass %. On the other hand, in order to further improve the tensile strength, the elongation, and the proof stress value, although the conductivity will slightly decrease, it is particularly preferably more than 0.80 mass % to 2.00 mass %, and further preferably 1.00 mass % to 2.00 mass %.

<Balance: Al and Inevitable Impurities>

The balance, i.e., components other than those described above, includes Al (aluminum) and inevitable impurities. Herein, inevitable impurities means impurities contained by an amount which could be contained inevitably during the manufacturing process. Since inevitable impurities could cause a decrease in conductivity depending on a content thereof, it is preferable to suppress the content of the inevitable impurities to some extent considering the decrease in the conductivity. Components that may be inevitable impurities include, for example, Ga, Zn, Bi, and Pb.

Such an aluminum alloy conductor wire can be obtained by controlling an alloy composition and a manufacturing process in combination. Hereinafter, a preferred method of manufacturing an aluminum alloy conductor wire of the present disclosure will be described.

(2) Compound in Al Matrix

In an aluminum alloy conductor wire of the present disclosure, a compound having a particle size of 0.5 to 5.0 µm and containing Fe exists at a density of 1 to 300 particles/10000 µm$^2$. The particle size of the compound is preferably 1.0 to 5.0 µm. The density of the compound is preferably 10 to 100 particles/10000 µm$^2$. That is, an abnormal growth of crystal grains can be inhibited uniformly by dispersing a Fe-based compound uniformly, and, as a result, an amount of plastic deformation upon crimping stabilizes. Therefore, crimp reliability upon crimping on an object can be achieved while achieving an excellent strength, and an aluminum alloy conductor wire for a wire harness can be provided that has a high mechanical and electrical connection reliability. When the density of a compound containing Fe and having a particle size of 0.5 to 5.0 µm is less than 1 particle/10000 µm$^2$, a pinning effect is small, and thus coarse grains are likely to be produced and shock resistance is low. Also, when the density of a compound containing Fe and having a particle size of 0.5 to 5.0 µm is greater than 300 particles/10000 µm$^2$, the strength is likely to decrease. Whether a compound contains Fe is determined using an EPMA (Electron Probe Micro Analyzer), and the particle size of the particles is a value obtained by measuring an area of a particle observed in a cross section of the aluminum alloy conductor wire using a free software "ImageJJ" and evaluated as a diameter converted into an equivalent circuit (circle equivalent diameter). The number density (particles/10000 µm$^2$) of a compound containing Fe and having a particle size of 0.5 to 5.0 µm was obtained by machining the aluminum alloy conductor wire by ion milling until a center of a cross section thereof is observable, observing the machined cross section with a scanning electron microscope (SEM), counting the number of particles of Fe-based compound having a particle size of 0.5 to 5.0 µm in a field size (1000 µm$^2$), and multiplying the counted number of particles of Fe-based compound by 10 to convert it into the number of particles per 10000 µm$^2$. Note that the numerical value of the number density of the compound is defined as an average value of the number densities of the aforementioned compound obtained at three cross sectional positions, i.e., first to third cross sections, which are spaced apart along a longitudinal direction of the aluminum alloy conductor wire. Specifically, the first cross sectional position is a position determined at random, the second cross sectional position is a position at a distance of greater than or equal to 1000 mm (e.g., 1000 mm) from the first cross sectional position, and the third cross sectional position is at a position at a distance of greater than or equal to 2000 mm (e.g., 2000 mm) from the first cross sectional position and at a distance of greater than or equal to 1000 mm (e.g., 1000 mm) from the second cross sectional position.

(3) Method of Manufacturing the Aluminum Alloy Conductor Wire According to the Present Disclosure The aluminum alloy wire conductor wire of the present disclosure can be manufactured by a manufacturing method including sequentially performing each process of [1] melting, [2] casting, [3] hot working (such as grooved roll working), [4] first wire drawing, [5] first heat treatment (intermediate heat treatment), [6] second wire drawing, [7] second heat treatment (solution heat treatment), and [8] third heat treatment (aging heat treatment). Note that a bundling step or a wire resin-coating step may be provided before or after the second heat treatment or after the aging heat treatment. Hereinafter, steps of [1] to [8] will be described.

[1] Melting

Melting is performed by adjusting quantities of each component such that the aforementioned aluminum alloy composition is obtained.

[2] Casting and [3] Hot Working (Such as Grooved Roll Working)

Subsequently, using a Properzi-type continuous casting rolling mill which is an assembly of a casting wheel and a belt, molten metal is cast with a water-cooled mold and rolling is performed continuously to obtain a bar having an appropriate size of, for example, 5 to 13 mmφ. Here, the cooling rate during casting is 0.1° C./s to 5.0° C./s, and preferably 0.1° C./s to 1.0° C./s. When the cooling rate during casting is less than 0.1° C./s, the cooling rate during casting is too low. In such a case, there will be an excessive number of particles (particles/10000 μm$^2$) of Fe-based compound having a particle size of 0.5 to 5.0 existing in a predetermined area is too much, and the strength will decrease. On the other hand, in a case where the cooling rate during casting is greater than 5.0° C./s, when the temperature increasing rate during solution heat treatment to be described below (second heat treatment) is greater than 20° C./s between room temperature and 550° C./s, the cooling rate during casting and the temperature increasing rate during solution heat treatment are too high. Accordingly, in such a case, the number of particles (particles/10000 μm$^2$) of Fe-based compound having a particle size of 0.5 to 5.0 μm in a predetermined area becomes too small, and thus crystal grains become coarse and abnormally grown grains are likely to be produced. As a result, shock resistance and wire crimping property of the crimp portion will decrease. Therefore, according to the present disclosure, in a case where the cooling rate during casting is greater than 5.0° C./s, the temperature increasing rate during the second heat treatment is limited to less than or equal to 20° C./s between room temperature and 550° C./s. Such casting and hot rolling may be performed by billet casting and an extrusion technique.

[4] First Wire Drawing

Subsequently, the surface is stripped and the bar is made into an appropriate size of, for example, 5 mmφ to 12.5 mmφ, and wire drawing is performed by cold rolling. It is preferable that a reduction ratio η is within a range of 1 to 6. The reduction ratio η is represented by:

$$\eta = \ln(A_0/A_1),$$

where $A_0$ is a wire rod cross sectional area before wire drawing and $A_1$ is a wire rod cross sectional area after wire drawing.

In a case where the reduction ratio η is less than 1, in a heat processing of a subsequent step, a recrystallized particle coarsens and a tensile strength and an elongation significantly decreases, which may cause a wire break. In a case where the reduction ratio η is greater than 6, the wire drawing becomes difficult and may be problematic from a quality point of view since a wire break might occur during a wire drawing process. The stripping of the surface has an effect of cleaning the surface, but does not need to be performed.

[5] First Heat Treatment (Intermediate Heat Treatment)

Then, a first heat treatment is applied to the work piece that has been subjected to cold drawing. Specifically, the first heat treatment includes heating to a predetermined temperature within a range of 300 to 480° C., and retaining for a retention time of 0.05 to 6 hours. The first heat treatment of the present disclosure is performed for regaining the flexibility of the work piece and for improving the wire drawing workability. It is not necessary to perform the first heat treatment if the wire drawing workability is sufficient and a wire break does not occur.

[6] Second Wire Drawing

After the first heat treatment, wire drawing is further carried out in a cold processing. Here, a reduction ratio η is preferably within a range of 1 to 6. The reduction ratio η has an influence on formation and growth of recrystallized grains. This is because, if the reduction ratio η is less than 1, during the heat treatment in a subsequent step, there is a tendency that coarsening of recrystallized grains occur and the tensile strength and the elongation drastically decrease, and if the reduction ratio η is greater than 6, wire drawing becomes difficult and there is a tendency that problems arise in quality, such as a wire break during wire drawing. It is to be noted that in a case where the first heat treatment is not performed, the first wire drawing and the second wire drawing may be performed in series.

[7] Second Heat Treatment (Solution Heat Treatment)

The second heat treatment is performed on the work piece that has been subjected to wire drawing. The second heat treatment of the present disclosure is a solution heat treatment for dissolving randomly contained compounds of Mg and Si into an aluminum matrix. With the solution heat treatment, it is possible to even out (to homogenize) the Mg and Si concentration parts during a working and leads to a suppression in the segregation of a Mg component and a Si component at grain boundaries after the final aging heat treatment. The second heat treatment is specifically a heat treatment including, in a case where the cooling rate during the aforementioned casting is greater than 5° C./s, heating to a predetermined temperature in a range of 480° C. to 620° C. at a temperature increasing rate of less than or equal to 20° C./s between room temperature and 550° C., retaining, and thereafter quenching. When the cooling rate during casting is greater than 5° C./s and the temperature increasing rate in the second heat treatment is greater than 20° C./s, the cooling rate during casting or the temperature increasing rate during solution heat treatment is too high. Accordingly, the number of particles of Fe-based compound having a particle diameter of 0.5 to 5.0 μm and containing Fe exists becomes less, and thus, the grain size becomes coarse and abnormally grown grains will be produced, and shock resistance decreases. When a predetermined temperature during the second heat treatment temperature is higher than 620° C., the crystal grains become coarse, and when the predetermined temperature is lower than 480° C., Fe-based compounds cannot be dispersed and precipitated. Herein, the abnormally grown grain refers to coarsened crystal grains having a diameter of greater than or equal to 50 μm and about one or two per wire size. Therefore, the predetermined temperature during heating in the second heat treatment is in a range of 480° C. to 620° C., and, preferably in a range of 520° C. to 580° C. On the other hand, in a case where the cooling rate during casting is 0.1 to 5° C./s, the range of temperature increasing rate is not particularly limited, but for example, 5 to 80° C./s.

A method of performing the second heat treatment may be, for example, high-frequency heating, or may be continuous heat treatment such as conduction heating, and running heating.

In a case where high-frequency heating and conduction heating are used, the wire rod temperature increases with an elapse of time, since it normally has a structure in which an electric current continues to flow through the wire rod. Accordingly, since the wire rod may melt when an electric current continues to flow through, it is necessary to perform heat treatment for an appropriate time range. In a case where running heating is used, since it is an annealing in a short time, the temperature of a running annealing furnace is usually set higher than a wire rod temperature. Since the wire rod may melt with a heat treatment over a long time, it is necessary to perform heat treatment in an appropriate time range. Hereinafter, the heat treatment by each method will be described.

The continuous heat treatment by high-frequency heating is a heat treatment by joule heat generated from the wire rod itself by an induced current by the wire rod continuously passing through a magnetic field caused by a high frequency. Steps of rapid heating and quenching are included, and the wire rod can be heat-treated by controlling the wire rod temperature and the heat treatment time. The cooling is performed, after rapid heating, by continuously allowing the wire rod to pass through water or in a nitrogen gas atmosphere. This heat treatment time is 0.01 s to 2 s, preferably 0.05 s to 1 s, and more preferably 0.05 s to 0.5 s.

The continuous conducting heat treatment is a heat treatment by joule heat generated from the wire rod itself by allowing an electric current to flow in the wire rod that continuously passes two electrode wheels. Steps of rapid heating and quenching are included, and the wire rod can be heat-treated by controlling the wire rod temperature and the heat treatment time. The cooling is performed, after rapid heating, by continuously allowing the wire rod to pass through water, atmosphere or a nitrogen gas atmosphere. This heat treatment time period is 0.01 s to 2 s, preferably 0.05 s to 1 s, and more preferably 0.05 s to 0.5 s.

A continuous running heat treatment is a heat treatment in which the wire rod continuously passes through a heat treatment furnace maintained at a high-temperature. Steps of rapid heating and quenching are included, and the wire rod can be heat-treated by controlling the temperature in the heat treatment furnace and the heat treatment time. The cooling is performed, after rapid heating, by continuously allowing the wire rod to pass through water, atmosphere or a nitrogen gas atmosphere. This heat treatment time period is 0.5 s to 30 s.

In a case where at least one of the wire rod temperature and the heat treatment time is lower than the condition defined above, the solution heat treatment will be incomplete, and precipitation of Fe-based compound will decrease, and an amount of increase in the tensile strength and the shock resistance becomes small. In a case where at least one of the wire rod temperature and the annealing time is higher than the condition defined above, the crystal grains will coarsen and a partial fusion (eutectic fusion) of a composition phase of an aluminum alloy conductor wire occurs, and the tensile strength and the elongation will decrease, and a wire break is likely to occur during the handing of the conductor wire.

[8] Third Heat Treatment (Aging Heat Treatment)

Subsequently, a third heat treatment is applied. The third heat treatment is performed for precipitating needle-like $Mg_2Si$ precipitates to improve the tension strength. In the aging heat treatment, the heating temperature is 100° C. to 250° C., and heating time is 0.5 to 15 hours. In a case where the heating temperature is lower than 100° C., needle-like $Mg_2Si$ precipitates cannot be sufficiently precipitated, and thus strength, bending fatigue resistance, and conductivity tends to be insufficient. In a case where the heating temperature is higher than 250° C., the size of $Mg_2Si$ precipitates increases and thus conductivity increases but the strength and bending fatigue resistance tend to be insufficient.

A strand diameter of the aluminum alloy conductor wire of the present disclosure is not particularly limited and can be determined as appropriate depending on an application, and it is preferably 0.1 mmφ to 0.5 mmφ for a fine wire, and 0.8 mmφ to 1.5 mmφ for a case of a middle sized wire. The aluminum alloy conductor wire of the present disclosure is advantageous in that it can be used as a thin single wire as an aluminum alloy wire, but may also be used as an aluminum alloy stranded wire obtained by stranding a plurality of them together, and among the aforementioned steps [1] to [8] of the manufacturing method of the present disclosure, after bundling and stranding a plurality of aluminum alloy conductor wires obtained by sequentially performing each of steps [1] to [6], the steps of [7] second heat treatment and [8] aging heat treatment may be performed.

Also, with the present disclosure, homogenizing heat treatment performed in the prior art may be performed as a further additional step after the continuous casting rolling. Since a homogenizing heat treatment makes it possible to uniformly disperse the precipitates of added elements (mainly, Mg—Si based compounds), it becomes easy to obtain a uniform crystal structure at the subsequent first heat treatment, and as a result, an improvement in tensile strength, elongation and a value of yield strength can be obtained more stably. The homogenizing heat treatment is preferably performed at a heating temperature of 450° C. to 600° C. for a heating time of 1 to 10 hours, and more preferably 500° C. to 600° C. Also, as for the cooling in the homogenizing heat treatment, a slow cooling at an average cooling rate of 0.1° C./min to 10° C./min is preferable since it becomes easier to obtain a uniform compound.

EXAMPLES

The present disclosure will be described in detail based on Examples below. It is to be noted that the present disclosure is not limited to Examples indicated below.

Examples and Comparative Examples

Mg, Si, Fe and Al, and selectively added Ti, B, Mn, Cr, Cu, Co, Ni and Zr are rolled using a Properzi-type continuous casting rolling mill such that the contents (mass %) are as shown in Table 1, while continuously casting a molten metal with a water-cooled mold and rolled into a bar of approximately φ 9.5 mm. A cooling rate during casting at this time showed values as indicated in Table 2. Then, a first wire drawing was applied to obtain a predetermined degree of wire drawing. Then, a first heat treatment at 300° C. to 480° C. for 0.05 to 6 hours was performed on a work piece subjected to the first wire drawing, and thereafter, a second wire drawing was performed with a reduction ratio similar to the first wire drawing until a wire size of φ 0.31 mm. Then, a second heat treatment applied at a temperature increasing rate shown in Table 2 with a maximum reached temperature of 480° C. to 620° C. In the first heat treatment, in a case of a batch heat treatment, a wire rod temperature was measured with a thermocouple wound around the wire rod. In a case of consecutive running heat treatment in the first and second heat treatment, a wire rod temperature in the vicinity of a heat treatment section outlet was measured. After the second heat treatment, an aging heat treatment was applied at 100° C. to 250° C. for 0.05 to 12 hours to produce an aluminum alloy wire having a finished diameter of 0.1 mmφ to 1.5 mmφ.

For each of aluminum alloy wires of the Example and the Comparative Example, each characteristic was measured by methods shown below. The results are shown in Table 2. Note that the numbers indicated in a column labeled "Alloy No." correspond to Alloy Nos. 1 to 17 in Table 1.

(A) Measurement of the Density of a Compound of Particle Size 0.5 to 5.0 μm and Containing Fe Aluminum alloy conductor wires of Examples and Comparative Examples were made into thin films by FIB method, and an area of 10000 μm² was observed at an observation magnification of 500 to 5000 times using a scanning electron microscope (SEM). In this observation area, the number of compounds having a particle size of 0.5 to 5.0 μm and containing Fe was counted and defined as a density (number/μm²). The particle size of particles was evaluated as a diameter (equivalent circle diameter) when an area of the observed particle was converted into an equivalent circle.

(B) Evaluation of Electric Wire Crimping Property of the Crimping Section

A terminal was crimped to an end portion of an aluminum alloy wire and an amount of plastic deformation of the aluminum alloy conductor wire after crimping with respect to before crimping was measured, and an amount of plastic deformation of 55% to 65% was determined as a pass level, and an amount of plastic deformation of less than 55% or greater than 65% was determined as a failure level.

(C) Measurement of Strength (YS) (0.2% Yield Strength/Tensile Strength)

In conformity with JIS Z2241, a tensile test was carried out for three materials under test (aluminum alloy wires) each time, and thereafter, 0.2% yield strength was calculated and an average thereof was taken. In order to maintain the strength of the crimp portion at a connecting portion between an electric wire and a terminal, a pass level for the strength was greater than or equal to 80 MPa and a failure level for the strength was less than 80 MPa.

TABLE 1

| Alloy No. | Composition (mass %) | | | | | | | | | | | |
|---|---|---|---|---|---|---|---|---|---|---|---|---|
| | Mg | Si | Fe | Cu | Co | Cr | Mn | Ni | Zr | Ti | B | Al |
| 1 | 0.40 | 0.35 | 0.20 | 0.05 | 0.05 | — | — | 0.10 | — | 0.010 | 0.003 | Balance |
| 2 | 0.40 | 0.45 | 0.20 | — | — | — | — | 0.10 | — | 0.010 | 0.003 | |
| 3 | 0.40 | 0.55 | 0.20 | — | — | 0.03 | 0.04 | 0.10 | — | 0.010 | 0.003 | |
| 4 | 0.40 | 0.65 | 0.60 | 0.03 | — | — | — | 0.05 | — | 0.010 | 0.003 | |
| 5 | 0.50 | 0.40 | 0.20 | — | — | 0.04 | 0.05 | 0.05 | — | 0.010 | 0.003 | |
| 6 | 0.50 | 0.50 | 0.30 | — | — | — | — | 0.10 | — | 0.010 | 0.003 | |
| 7 | 0.50 | 0.60 | 0.20 | — | — | — | — | 0.05 | 0.01 | 0.020 | 0.003 | |
| 8 | 0.50 | 0.70 | 0.20 | — | — | — | — | 0.10 | — | 0.010 | 0.003 | |
| 9 | 0.60 | 0.50 | 0.20 | — | — | 0.04 | — | 0.10 | — | 0.010 | 0.003 | |
| 10 | 0.60 | 0.60 | 0.20 | — | — | — | — | 0.15 | — | 0.010 | 0.003 | |
| 11 | 0.60 | 0.70 | 0.20 | — | 0.05 | — | 0.10 | 0.05 | — | 0.010 | 0.003 | |
| 12 | 0.60 | 0.80 | 1.00 | — | — | — | — | 0.10 | 0.05 | 0.010 | 0.003 | |
| 13 | 0.50 | 0.50 | 0.30 | — | — | — | — | — | — | — | — | |
| 14 | 0.50 | 0.50 | 0.30 | — | — | — | — | 0.15 | — | — | — | |
| 15 | 0.50 | 0.50 | 0.30 | — | — | — | — | — | — | 0.010 | — | |
| 16 | 0.50 | 0.50 | 0.30 | — | — | — | — | — | — | 0.010 | 0.003 | |
| 17 | 0.50 | 0.50 | 0.30 | — | — | — | — | — | — | — | 0.003 | |

TABLE 2

| | | | Manufacturing Condition | | | |
|---|---|---|---|---|---|---|
| | | | Casting Process | Solution Heat Treatment Process Temperature Increasing Rate between Room Temperature and 550° C. (° C./s) | Micro-structure Density of Fe-based Compound Having a Particle Size of 0.5 to 5 μm (Particles/ 10000 μm²) | Characteristic |
| | | Alloy No. | Cooling Rate (° C./s) | | | Wire Crimping Property | Strength (YS) |
| EXAMPLE | 1 | 1 | 0.5 | 80 | 200 | ○ | ○ |
| | 2 | 2 | 2 | 70 | 160 | ○ | ○ |
| | 3 | 3 | 3 | 75 | 110 | ○ | ○ |
| | 4 | 4 | 0.5 | 10 | 250 | ○ | ○ |
| | 5 | 5 | 2 | 15 | 130 | ○ | ○ |
| | 6 | 6 | 0.5 | 80 | 180 | ○ | ○ |
| | 7 | 7 | 2 | 70 | 150 | ○ | ○ |
| | 8 | 8 | 3 | 75 | 100 | ○ | ○ |
| | 9 | 9 | 0.5 | 10 | 220 | ○ | ○ |
| | 10 | 10 | 2 | 15 | 140 | ○ | ○ |

TABLE 2-continued

| | Alloy No. | Manufacturing Condition | | Micro-structure Density of Fe-based Compound Having a Particle Size of 0.5 to 5 µm (Particles/10000 µm²) | Characteristic | |
|---|---|---|---|---|---|---|
| | | Casting Process Cooling Rate (° C./s) | Solution Heat Treatment Process Temperature Increasing Rate between Room Temperature and 550° C. (° C./s) | | Wire Crimping Property | Strength (YS) |
| | 11 | 3 | 10 | 80 | ○ | ○ |
| | 12 | 25 | 10 | 25 | ○ | ○ |
| | 13 | 30 | 5 | 15 | ○ | ○ |
| | 14 | 80 | 15 | 4 | ○ | ○ |
| | 15 7 | 3 | 10 | 80 | ○ | ○ |
| | 16 8 | 25 | 10 | 30 | ○ | ○ |
| | 17 9 | 30 | 5 | 50 | ○ | ○ |
| | 18 10 | 80 | 15 | 5 | ○ | ○ |
| | 19 11 | 0.5 | 80 | 240 | ○ | ○ |
| | 20 12 | 2 | 70 | 280 | ○ | ○ |
| | 21 13 | 3 | 75 | 80 | ○ | ○ |
| | 22 14 | 0.5 | 10 | 230 | ○ | ○ |
| | 23 15 | 2 | 15 | 100 | ○ | ○ |
| | 24 16 | 3 | 10 | 60 | ○ | ○ |
| | 25 17 | 25 | 10 | 20 | ○ | ○ |
| COMPARATIVE EXAMPLE | 1 1 | 0.01 | 10 | 350 | ○ | x |
| | 2 2 | 0.01 | 80 | 350 | ○ | x |
| | 3 3 | 0.05 | 10 | 350 | ○ | x |
| | 4 4 | 0.05 | 80 | 350 | ○ | x |
| | 5 5 | 15 | 50 | 0.3 | x | ○ |
| | 6 6 | 0.01 | 10 | 400 | ○ | x |
| | 7 | 0.01 | 80 | 400 | ○ | x |
| | 8 | 0.05 | 10 | 350 | ○ | x |
| | 9 | 0.05 | 80 | 350 | ○ | x |
| | 10 | 15 | 50 | 0.3 | x | ○ |
| | 11 | 15 | 80 | 0.5 | x | ○ |
| | 12 | 50 | 80 | 0.1 | x | ○ |
| | 13 7 | 0.01 | 10 | 400 | ○ | x |
| | 14 8 | 0.01 | 80 | 500 | ○ | x |
| | 15 9 | 0.05 | 10 | 350 | ○ | x |
| | 16 10 | 0.05 | 80 | 400 | ○ | x |
| | 17 11 | 15 | 50 | 0.5 | x | ○ |
| | 18 12 | 0.05 | 10 | 800 | ○ | x |
| | 19 13 | 50 | 80 | 0.4 | x | ○ |
| | 20 14 | 0.01 | 10 | 350 | ○ | x |
| | 21 15 | 0.01 | 80 | 400 | ○ | x |
| | 22 16 | 0.05 | 10 | 350 | ○ | x |
| | 23 17 | 0.05 | 80 | 350 | ○ | x |

N.B. NUMERICAL VALUES IN BOLD ITALIC IN THE TABLE ARE OUT OF APPROPRIATE RANGE OF THE EXAMPLE

The following is elucidated from the results indicated in Table 2. Each of the aluminum alloy wires of Examples 1 to 25 had an excellent strength as well as an excellent electric wire crimping property. On the other hand, each of the aluminum alloy wires of Comparative Examples 1 to 4, 6 to 9, 13 to 16, 18 and 20 to 23 had a cooling rate during the casting of less than 0.1° C./s, which is out of range of the present disclosure, and a density of the Fe-based compound having a particle size of 0.5 to 5.0 µm was out of range of the present disclosure, and were inferior in strength. Each of the aluminum alloy wires of Comparative Examples 5, 10 to 12, 17 and 19 had a cooling rate during the casting of greater than or equal to 15° C./s and a temperature increasing rate during the solution heat treatment of greater than or equal to 50° C./s, that are out of range of the present disclosure, and the aforementioned density of the Fe-based compound is out of range of the present disclosure, and the electric wire crimping property of the crimp portion was inferior.

The aluminum alloy conductor wire of the present disclosure enables to provide an aluminum alloy conductor wire, an aluminum alloy stranded wire, a coated wire and a wire harness used as a conductor of an electric wiring structure that has an improved electric wire crimping property while maintaining excellent strength as well as to provide a method of manufacturing the aluminum alloy conductor wire, and also useful as a battery cable, a harness, or a conductor for motor installed in transportation vehicles, and a wiring structure of an industrial robot. Further, since the aluminum alloy conductor wire of the present disclosure has a high strength, an electric wire size can be decreased as compared to conventional electric wires.

What is claimed is:

1. An aluminum alloy conductor wire having a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, a density of a compound having a particle size of 0.5 to 5.0 μm and containing Fe being 1 to 300 particles/10000 μm².

2. The aluminum alloy conductor wire according to claim 1, wherein the composition contains at least one selected from a group comprising Ti: 0.001 mass % to 0.100 mass % and B: 0.001 mass % to 0.030 mass %.

3. The aluminum alloy conductor wire according to claim 1, wherein the composition contains at least one selected from a group comprising Cu: 0.01 mass % to 1.00 mass %, Ag: 0.01 mass % to 0.50 mass %, Au: 0.01 mass % to 0.50 mass %, Mn: 0.01 mass % to 1.00 mass %, Cr: 0.01 mass % to 1.00 mass %, Zr: 0.01 mass % to 0.50 mass %, Hf: 0.01 mass % to 0.50 mass %, V: 0.01 mass % to 0.50 mass %, Sc: 0.01 mass % to 0.50 mass %, Co: 0.01 mass % to 0.50 mass %, and Ni: 0.01 mass % to 0.50 mass %.

4. The aluminum alloy conductor wire according to claim 1, wherein the composition contains Ni: 0.01 mass % to 0.50 mass %.

5. The aluminum alloy conductor wire according to claim 1, wherein a total of contents of Fe, Ti, B, Cu, Ag, Au, Mn, Cr, Zr, Hf, V, Sc, Co, and Ni is 0.01 mass % to 2.00 mass %.

6. The aluminum alloy conductor wire according to claim 1, wherein the aluminum alloy conductor wire is an aluminum alloy wire having a diameter of 0.1 mm to 1.5 mm.

7. An aluminum alloy stranded wire comprising a plurality of aluminum alloy conductor wires as claimed in claim 6 which are stranded together.

8. A coated wire comprising a coating layer at an outer periphery of one of the aluminum alloy conductor wire as claimed in claim 6 and an aluminum alloy stranded wire comprising a plurality of aluminum alloy conductor wires which are stranded together.

9. A wire harness comprising:
a coated wire including a coating layer at an outer periphery of one of an aluminum alloy conductor wire and an aluminum alloy stranded wire, the aluminum alloy stranded wire comprising a plurality of the aluminum alloy conductor wires which are stranded together; and
a terminal fitted at an end portion of the coated wire, the coating layer being removed from the end portion,
wherein the aluminum alloy conductor wire has a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained, and a density of a compound having a particle size of 0.5 to 5.0 μm and containing Fe is 1 to 300 particles/10000 μm².

10. A method of manufacturing an aluminum alloy conductor wire having a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained,
a density of a compound having a particle size of 0.5 to 5.0 μm and containing Fe being 1 to 300 particles/10000 μm²,
the method comprising: forming a rough drawing wire through hot working subsequent to melting and casting, and thereafter carrying out processes including at least a wire drawing process, a solution heat treatment process and an aging heat treatment process,
wherein a cooling rate during the casting is 0.1° C./s to 5° C./s.

11. A method of manufacturing an aluminum alloy conductor wire having a composition comprising Mg: 0.1 mass % to 1.0 mass %, Si: 0.1 mass % to 1.20 mass %, Fe: 0.01 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass%, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, where Ti, B, Cu, Ag, Au, Mn, Cr, Zr, Hf, V, Sc, Co and Ni are arbitrary additive components of which at least one component may be contained or none of the components may be contained,
a density of a compound having a particle size of 0.5 to 5.0 μm and containing Fe being 1 to 300 particles/10000 μm²,
the method comprising: forming a rough drawing wire through hot working subsequent to melting and casting, and thereafter carrying out processes including at least a wire drawing process, a solution heat treatment process and an aging heat treatment process,
wherein a cooling rate during the casting has a value greater than 5° C./s, and a temperature increasing rate during the solution heat treatment is less than or equal to 20° C./s between room temperature and 550° C.

* * * * *